Nov. 19, 1963    W. McCLAIN    3,110,997
POWER LAWN TRIMMER
Filed March 8, 1963
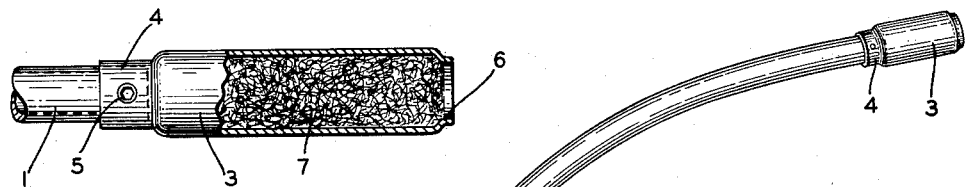
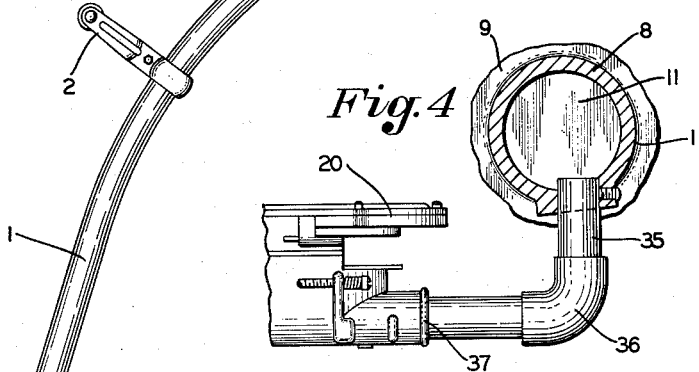
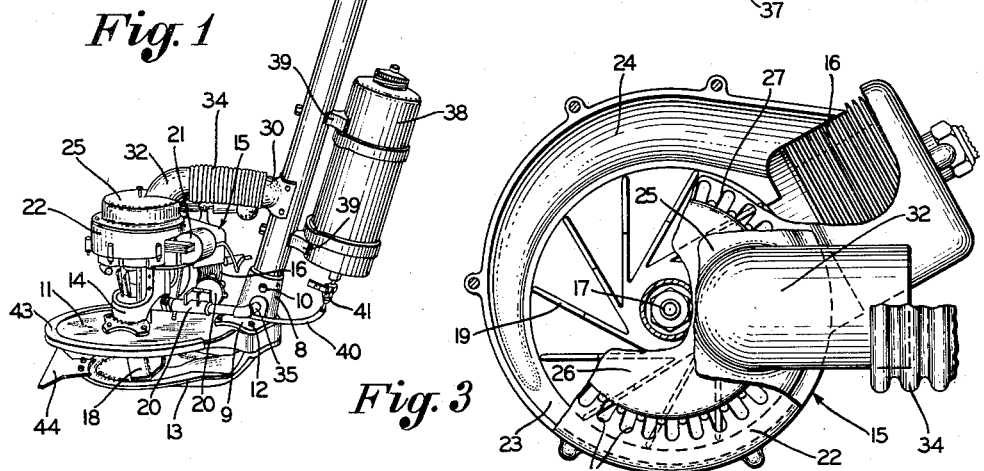
INVENTOR.
Waite McClain
BY
Frease, Bishop, Johns & Schick
ATTORNEYS

United States Patent Office 3,110,997
Patented Nov. 19, 1963

3,110,997
POWER LAWN TRIMMER
Waite McClain, 3505 Darlington, NW., Canton, Ohio
Filed Mar. 8, 1963, Ser. No. 263,926
3 Claims. (Cl. 56—25.4)

The invention relates to power lawn trimmers, and more particularly to that type of lawn trimmer in which a motor-driven cutting blade, rotating in a substantially horizontal plane, is carried upon the lower end of an elongated curved handle.

Lawn trimmers of this type are provided with a shoe located below the cutting blade, for sliding contact upon the ground, when the trimmer is manually moved back and forth over the lawn when the handle is grasped at spaced points by the operator's hands and moved in a swinging motion.

Power-driven grass trimmers of this general type have been provided in which the handle is tubular and air is drawn therethrough and directed upwardly around the engine for cooling the same. It has been found in actual practice that great difficulty has been experienced in the use of such devices.

After only a very few hours of use the engine and associated parts of such lawn trimmers become so clogged with dirt, dust, grass clippings and the like, that they are unfit for further use until cleaned. This cleaning requires considerable time during which the lawn trimmer is necessarily out of use.

Such lawn trimmers are especially designed for use in such places as cemeteries, where it is necessary to trim the grass close to monuments and stones. The usual guard ring, provided for protecting the rotary cutting blade, contact such objects, causing damage to the monuments and stones as well as to said guard ring.

It is an object of the invention to provide an improved power lawn trimmer which overcomes the above disadvantages and difficulties in lawn trimmers of this type.

Another object of the invention is to provide such a lawn trimmer in which a filter is provided at the upper end of the tubular handle for adequately filtering the air drawn through the handle.

A further object of the invention is to provide a power lawn trimmer of the character referred to in which the filter is easily removed and readily cleaned and replaced upon the tubular handle.

A still further object of the invention is to provide a power lawn trimmer of this character in which air is withdrawn from the tubular handle at a point spaced from the lower end thereof and conveyed through a branch pipe to an air chamber housing above the engine, and then discharged downward through a fan chamber onto heat dissipating fins surrounding the engine cylinder for rapidly cooling the same.

Another object of the invention is to provide such a lawn trimmer in which a portion of the air is withdrawn from the lower end of the tubular handle and supplied directly to the carburetor.

A further object of the invention is to provide a lawn trimmer of the type referred to, in which a rubber bumper surrounds the guard ring to protect the same as well as monuments, stones or other objects with which it comes into contact while the trimmer is in use.

And another object of the invention is to provide a lawn trimmer of this character in which there is a free flow of air from the tubular handle direct to the fan chamber at the top of the engine.

The above and other objects, apparent from the drawing and following description, may be attained, the above described difficulties overcome and the advantages and results obtained, by the apparatus, construction, arrangements and combinations, subcombinations and parts which comprise the present invention, a preferred embodiment of which, illustrative of the best mode in which applicant has contemplated applying the principle, being set forth in detail in the following description and illustrated in the accompanying drawing, in which:

FIG. 1 is a perspective view of the improved lawn trimmer;

FIG. 2 is a vertical section, on a larger scale, through the fan housing, air chamber housing and air inlet pipe connected to the tubular handle;

FIG. 3 is a top plan view of the air housing and fan housing, with parts broken away to show the manner of air cooling the engine;

FIG. 4 is a plan sectional view through the lower portion of the tubular housing, showing the air pipe to the carburetor; and, FIG. 5 is a longitudinal sectional view through the air filter at the uper end of the tubular handle.

Referring now more particularly to the embodiment of the invention illustrated in the drawing, the curved tubular handle upon which the device is mounted is indicated at 1 and is provided with a hand grip 2 intermediate its ends.

A filter is provided at the upper open end of the handle 1, said filter comprising the hollow cylindrical housing 3 with reduced neck 4 located over the end of the handle and fixed thereon as by set screw 5.

The outer end of the filter housing 3 is preferably slightly reduced in diameter, as at 6, in order to assist in retaining the filtering material 7, such as glass or other fibers, or the like, therein. A collar 8, with flange 9 at its lower end, is attached to the lower end of the hollow handle 1, as by the set screw 10.

The motor mounting plate 11, which is of substantially circular shape, is attached to the flange 9, as by bolts 12 which also attach the shoe 13, which is adapted to slide upon the ground as the trimmer is manipulated by means of the handle.

A motor is mounted upon the mounting plate 11 as by the bracket 14. The motor is indicated generally at 15 and includes the cylinder 16 with air cooling fins thereon, and the crank shaft 17, having cutting blade 18 mounted upon its lower end and fan 19 upon its upper end. A carburetor is indicated at 20 and a magneto at 21.

The fan 19 is housed within the fan chamber 22, in the bottom wall 23 of which is formed the spiral, progressively larger outlet groove 24, which discharges onto the cylinder 16 for cooling the same.

The air chamber housing 25 is mounted upon the top of the fan chamber 22, surrounding and spaced from the perforate dome 26 thereof which is provided with the slots 27 to form communication between the air chamber 28 and fan chamber 29.

An air inlet pipe connects the air chamber housing 25 to the tubular handle 1 at a point spaced from the lower end of the handle. As shown in the drawing, a T-connection 30 is attached to the tubular handle 1, at a point spaced from the lower end thereof, and communicates with the interior of the tubular handle through the opening 31 therein.

An inlet elbow 32 is formed upon the air chamber housing 25 at the inlet opening 33 thereof. Flexible hose 34 is attached to the opposed ends of the T-connection 30 and the elbow 32. Thus, clean filtered air is drawn from the tubular handle 1 through this inlet pipe to the air chamber 28 and thence through the slots 27 into the fan chamber 29 by the fan 19.

This air is then discharged from the fan chamber through the spiral duct 24 onto the finned exterior of the cylinder 16 cooling the same. An inlet pipe 35, with elbow 36, leads from the lower end of the tubular handle 1 to the air inlet 37 of the carburetor, as best shown in FIG. 4. Thus, clean filtered air from the tubular handle 1 is furnished to the carburetor.

A gas tank 38 is connected to the lower end portion of the tubular handle 1, at a point opposite to the cutting head and engine, as by brackets 39, a gas pipe 40 leading from the tank to the carburetor and being controlled by a pet cock 41.

The circular engine mounting plate 11 is of larger diameter than the cutting blade 18, so as to form a guard ring thereof. A rubber bumper 43, of channel section, is mounted around the periphery of the plate 11 in order to provide protection for monuments, stones and the like, which the same may contact when trimming around such objects.

A substantially T-shape guide member 44 is shown attached to the forward side of the shoe 13 for guiding grass toward the cutter blade.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. In a power lawn trimmer, a tubular handle, a horizontal engine mounting plate at the lower end of said handle, an internal combustion engine mounted upon said plate and including a horizontally disposed cylinder and a vertical crank shaft journalled through said mounting plate, a cutting blade fixed to the lower end of said shaft, a fan housing connected to the top of the engine, a fan in the fan housing and fixed upon said shaft, an air chamber housing on top of the fan housing and communicating therewith, the fan housing having an outlet directed toward the engine cylinder to discharge air about the cylinder for cooling the same, the upper portion of said tubular handle being disposed a considerable distance above the engine when the trimmer is in use and being arranged to be grasped in the hands of an operator, a filter comprising an open-ended elongated cylindrical housing at the upper end of said tubular handle and fibrous filtering material in said cylindrical housing, an air inlet pipe connected to the tubular handle at a point spaced from the lower end thereof and communicating with the air chamber housing, a carburetor connected to the engine, and a second air inlet pipe connected to the lower end of said tubular handle and communicating with said carburetor.

2. In a power lawn trimmer, a tubular handle, a horizontal engine mounting plate at the lower end of said handle, a filter comprising an open-ended cylindrical housing at the upper end of said tubular handle and fibrous filtering material in said cylindrical housing, an internal combustion engine mounted upon said plate and including a horizontally disposed cylinder and a vertical crank shaft journalled through said mounting plate, a cutting blade fixed to the lower end of said shaft, the upper portion of said tubular handle being disposed a considerable distance above the engine when the trimmer is in use and being arranged to be grasped in the hands of an operator, said engine mounting plate being circular and of larger diameter than said cutting blade and providing a guard ring therefor, a fan housing connected to the top of the engine, a slotted dome on top of said fan housing, a fan in the fan housing and fixed upon said shaft, an air chamber housing surrounding said dome on top of the fan housing and communicating therewith through the slots in the dome, the fan housing having a spiral outlet directed toward the engine cylinder to discharge air about the cylinder for cooling the same, an air inlet pipe connected to the tubular handle at a point spaced from the lower end thereof and communicating with the air chamber housing, a carburetor connected to the engine, and a second air inlet pipe connected to the lower end of said tubular handle and communicating with said carburetor.

3. In a power lawn trimmer, a tubular handle, a horizontal engine mounting plate at the lower end of said handle, an internal combustion engine mounted upon said plate and including a horizontally disposed cylinder and a vertical crank shaft journalled through said mounting plate, a cutting blade fixed to the lower end of said shaft, a fan housing connected to the top of the engine, a fan in the fan housing and fixed upon said shaft, an air chamber housing on top of the fan housing and communicating therewith, the fan housing having a spiral outlet directed toward the engine cylinder to discharge air about the cylinder for cooling the same, the upper portion of said tubular handle being disposed a considerable distance above the engine when the trimmer is in use and being arranged to be grasped in the hands of an operator, a filter comprising an open-ended elongated cylindrical housing at the upper end of said tubular handle and fibrous filtering material in said cylindrical housing, an air inlet pipe connected to the tubular handle at a point spaced from the lower end thereof and communicating with the air chamber housing, a carburetor connected to the engine, and a second air inlet pipe connected to the lower end of said tubular handle and communicating with said carburetor.

References Cited in the file of this patent

UNITED STATES PATENTS

| | | |
|---|---|---|
| 2,597,774 | Butter | May 20, 1952 |
| 2,660,847 | Britten | Dec. 1, 1953 |
| 2,708,920 | Pasturczak | May 24, 1955 |
| 2,754,809 | Hainke | July 17, 1956 |
| 2,934,876 | Perrino | May 3, 1960 |